July 20, 1948.                H. D. GURSKY                2,445,396
                                 CLAMP
Filed July 12, 1946                                    2 Sheets-Sheet 1
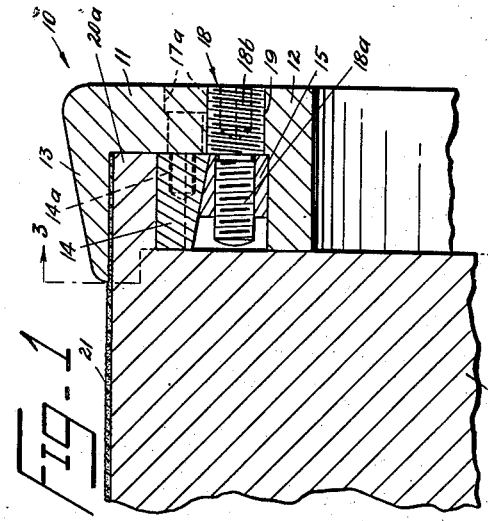
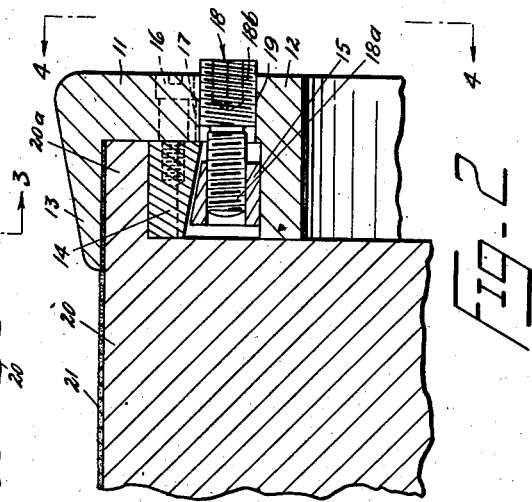
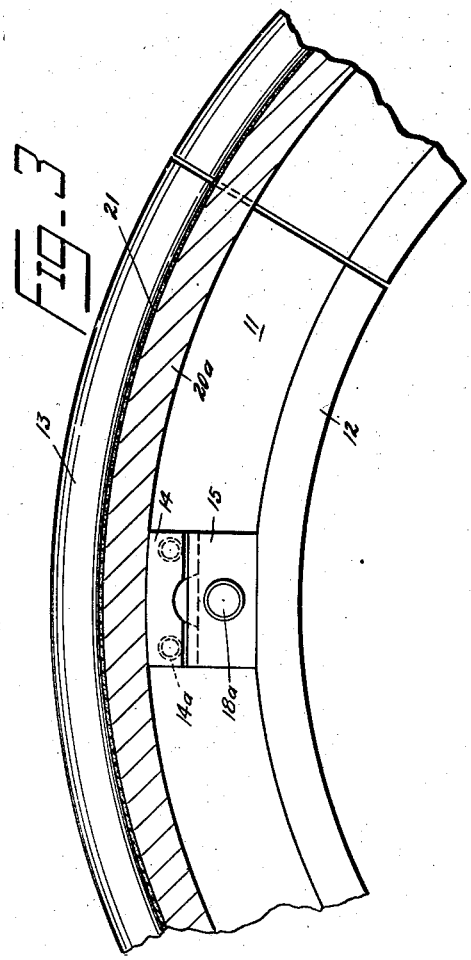
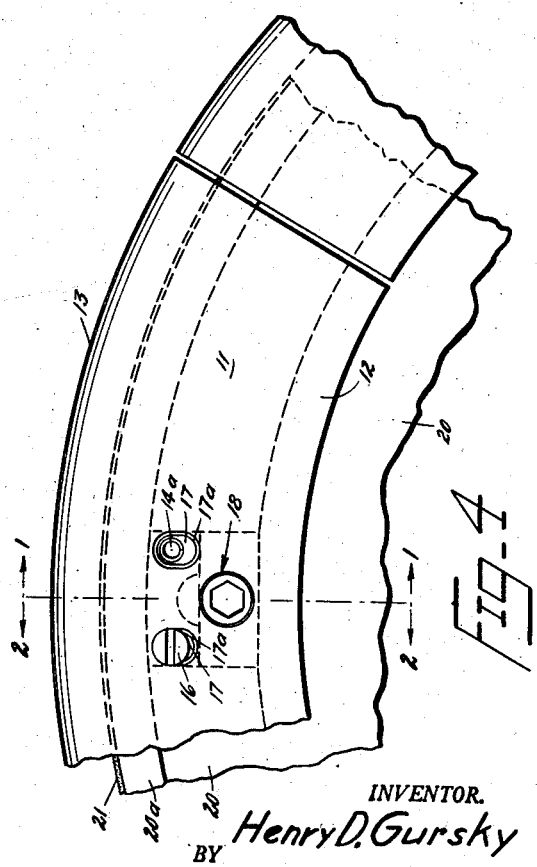
INVENTOR.
Henry D. Gursky
BY
    John W. Hoag
     Attorney July 20, 1948.   H. D. GURSKY   2,445,396
CLAMP
Filed July 12, 1946   2 Sheets-Sheet 2
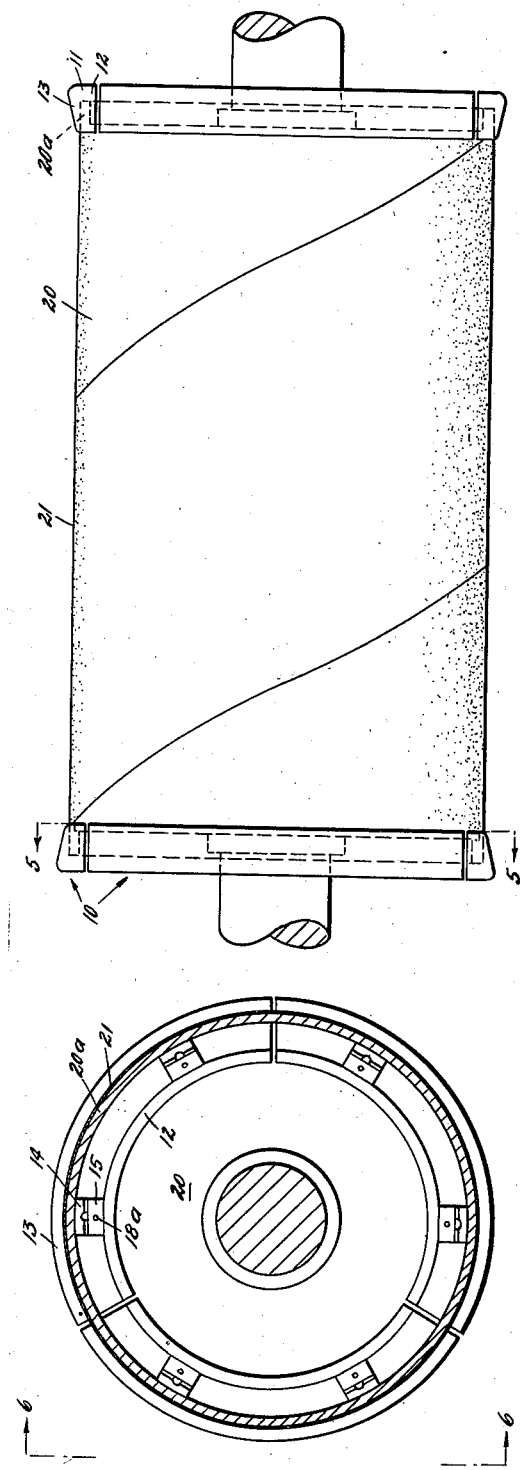
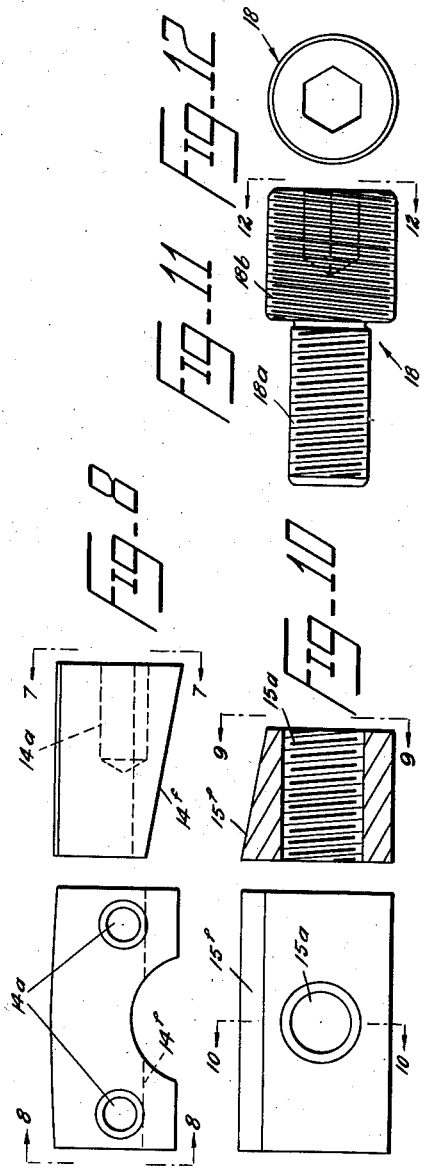
INVENTOR.
Henry D. Gursky
BY
John W. Hoag.
Attorney Patented July 20, 1948

2,445,396

UNITED STATES PATENT OFFICE 2,445,396

CLAMP

Henry D. Gursky, Gloversville, N. Y., assignor to Curtin-Hebert Company, Inc., Gloversville, N. Y., a corporation of New York Application July 12, 1946, Serial No. 683,286

8 Claims. (Cl. 51—194)

1

This invention relates to a clamp. The clamp members may be shaped to conform to the surface to which they are to be applied. One specific use for the clamp is to detachably secure a sheet of sandpaper wrapped around a cylinder which may be rotatably mounted to provide a wide gauge buffing or abrading surface. For such an operation clamp members are required adapted to overcome large frictional forces which tend to displace the sheet, and to quickly destroy it if it becomes loose or displaced. It is also important that the clamp can be quickly positioned and tightened and released since the sheets have to be frequently replaced.

Accordingly it is an object of this invention to provide a simple, practical and efficient demountable clamp.

Another object of the invention is to provide dependable clamp means which can be speedily tightened and released.

Another object of the invention is to provide clamp means adapted to cooperate with an annular flange protruding from the end of a cylinder to fasten a replaceable flexible member on and around the surface of the cylinder.

Another object of the invention is to provide clamp means adapted to fit over a curved surface around a section of a circle.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is an elevational view, partly in section, taken on the line 1—1 of Figure 4, showing a clamp being locked in position over the flange 20ª;

Figure 2 is a view similar to Figure 1, taken on the line 2—2 of Figure 4, showing the clamp being released but before screws 16 have been loosened;

Figure 3 is a front view of the clamp taken on the line 3—3 of Figure 1;

Figure 4 is an end view, looking in the direction indicated by the arrows 4—4 in Figure 2;

Figure 5 is a front view of a number of clamps applied over the end flange of a cylindrical member to secure a flexible strip on the surface of the member;

Figure 6 is an elevational view looking in the direction indicated by the arrows 6—6 in Figure 5;

Figure 7 is a rear elevational view of one wedging or locking element of the clamp;

Figure 8 is a side view of the member shown in Figure 7;

Figure 9 is a rear elevation of a second wedge or locking member utilized in the clamp;

Figure 10 is a sectional side view of the element shown in Figure 9;

Figure 11 is an elevation of a double ended differentially threaded screw used in connection with the element shown in Figures 9 and 10; and Figure 12 is an end view of the device shown in Figure 11 looking in the direction of the arrows 12—12.

In the embodiment of the invention illustrated herein a clamp body member 10 is shown comprising, a central or intermediate portion 11 interconnecting, a base portion 12 projecting at a right angle to the portion 11 from one end of member 11, and a portion or jaw 13 projecting at a right angle from the other end of member 11 and parallel with portion 12.

Cooperating with the clamp body 10 are the wedge members 14 and 15 respectively each of which has an inclined face, the inclined face of one wedge being complementary to the inclined face of the other member. As illustrated herein the wedges are mounted on the clamp body 10 with the inclined face 14ᶠ of member 14 arranged in abutting relation to the inclined face 15ᶠ of member 15.

Each member 14 is provided with two bores 14ª extending into said member from the rear and internally threaded to receive the threaded ends of shoulder screws 16 respectively. The central portion 11 of the clamp 10 has the oval shaped slots 17 adapted to receive the screws 16 respectively and to give them some freedom of movement toward and away from clamp arm 13 to facilitate the positioning and the locking and the unlocking of the members 14. The enlarged heads of screws 16 are received within the outer ends of slots 17 but bridge the shoulders 17ª formed in the side walls of the slots.

Member 15, which, as illustrated, may be shorter from front to rear than member 14, has a bore 15ª extending through it from front to rear, internally screw threaded to receive therein the forward portion 18ª of a screw member 18, hereinafter referred to as a differential screw, which also has a portion 18ᵇ of increased diameter adapted to be received within a bore 19 in said clamp portion 11, bore 19 being located below, and preferably intermediate, the slots 17.

The screw member 18 is differentially threaded. By this is meant that the portion 18ª is threaded with less screw threads than the portion 18ᵇ. For example the portion 18ª may be given eighteen right hand screw threads, while the portion 18ᵇ may be given twenty left hand screw threads. As a result the same rotative movement by which the portion 18ᵇ of differential screw 18 is engaged in the threaded bore 19 of clamp portion 11, and moved inwardly, will serve to engage member 15 on said portion 18ª, and cause member 15 to travel down the full length of the portion 18ª until the wedge member 14 has been elevated sufficiently so that the members to be secured together, which in the application of the clamp illustrated herein are the annular flange 20ª and the strip of sandpaper 21, have been firmly engaged between member 14 and jaw 13. Because of the difference in the number of the screw threads on the portions 18ª and 18ᵇ respectively the wedge 15 will travel inwardly or outwardly on screw portion 18ª faster than portion 18ᵇ will travel inwardly or outwardly of bore 19. Thus member 15 may be completely seated to elevate member 14 to the limit of its upward, or radially outward, movement controlled by the length of slots 17, and provide a lock for member 14, and the movement of member 15 for locking or unlocking may be speedily accomplished.

Screw 18 may desirably be formed with a socket head as shown, designed to receive a tool by which force sufficient to readily turn the screw may be applied.

In assembling each clamp 10 the screws 16 are inserted into the slots 17 respectively and their threaded ends are engaged in the bores 14ª respectively of the wedge member 14. Each screw 16 is tight against its shoulder but is movable lengthwise of the slot 17 through which it extends due to the fact that the shoulder section of the screw is made a little longer than the thickness of the cross section of the intermediate clamp portion 11 through which the screw extends. Thus each screw 16 and the wedge member 14 into which it mates, are movable to the extent permitted by the length of the slot 17 through which the screw extends. Next the differential screw 18 is inserted in the threaded bore 19 of clamp portion 11 with its end 18ª projecting inwardly in a position to receive thereon the member 15. Screw 18 is now turned causing wedge member 15 to be drawn inwardly on 18ª until the clamp is tightened. Since its face 15ᶠ is toward the face 14ᶠ of wedge member 14, as member 15 moves inwardly it will move the member 14 toward jaw 13, within the range of movement of screws 16 permitted by the length of the slots 17 in clamp portion 11ª. Thus member 14 serves as a clamp arm or jaw engaging the under or near surface of flange 20ª of cylinder 20, in coaction with clamp portion 13 which engages the other surface of flange 20ª or any member interposed between it and the surface of cylinder 20.

In the embodiment of the invention illustrated in the drawings the clamp portion or jaw 13 engages and securely holds on the periphery of cylinder 20 a sheet of sandpaper 21 which is wound around the surface of the drum. The member 15 serves to hold member 14 against the under surface of cylinder flange 20ª thus pulling the clamp portion or jaw 13 down to engage the sheet of sandpaper.

When it is desired to unlock the clamp, as for example, for substituting a new sheet of sandpaper for a used sheet, it is only necessary to rotate differential screw 18 in a direction to cause wedge 15 to travel outwardly on screw portion 18ª, thus relieving the pressure exerted on the wedge member 14 and allowing member 14 and its screws 16 to move away from the lower face of the flange 20ª of cylinder 20. The extent of movement of screws 16 within slots 17 is sufficient to permit a new sheet of sandpaper to be substituted for a used sheet without disengaging member 14 from the screws 16.

It will thus be seen that there has been provided by this invention an apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. A clamp comprising a U-shaped member, a wedge member movably supported within the arms of said U-shaped member, and a second wedge member positioned within the arms of said U-shaped member in abutting relation to said first wedge member, and means for moving one wedge member relative to the other to control the position of said first wedge member.

2. A clamp comprising an angle member having a first arm, a second arm substantially at right angles to said first arm, a first member having opposite faces angularly disposed with respect to one another, means for supporting said member from said second arm for movement toward or away from said first arm, a second member having opposite faces angularly disposed with respect to one another, and means for supporting said second member from said second arm and for moving it toward or away from said second arm to cause an inclined face of said second member to engage an oppositely inclined face of said first member to move said first member toward said first arm and to hold said first member in its position after being moved.

3. A clamp adapted to fit over an annular flange on the end of a cylindrical member to lock a flexible member on the surface of said cylindrical member, comprising an angle member having a jaw adapted to fit over a portion of the annular flange of said cylindrical member, and a support portion angularly related to said jaw portion and adapted to extend substantially parallel to an end surface of said cylindrical member, a second jaw member detachably mounted on said support portion having an upper surface adapted to fit up against the under side of the said annular flange of said cylindrical member and having an under surface inclined from said support portion toward said annular flange, and means for positioning and locking said second jaw member against said annular flange comprising a wedge member having an inclined face, and means for supporting said wedge member for movement toward or away from said support portion with its inclined face opposed to the inclined face of said second jaw member and positioned to progressively engage and elevate said second jaw member.

4. A clamp comprising a support portion, and upper and lower jaw members supported from said support portion in parallel relation, one of said jaw members being movable toward and away from the other, a wedge member, and means supported from said support portion for moving said wedge member to control the position of said movable jaw member relative to the other of said jaw members and to serve as a releasable lock for said movable jaw member.

5. A clamp comprising a support portion, and a fixed jaw member and a movable jaw member supported from said support portion substantially in parallel relation, a wedge member, having a grooved bore, and said support portion having a grooved bore of greater diameter than the said bore of said wedge member, and a screw having differentially threaded portions including a head portion threaded to engage in the said bore of said support portion, and a portion of less diameter than said head portion adapted to engage in the said bore in said wedge member, the grooves of said bores being opposite hand, and the two threaded portions of said screw being oppositely hand whereby the same rotation of the screw for seating its head portion in said support portion will draw said wedge onto and along the portion of less diameter of said screw and progressively into engagement with said movable jaw member to move it toward said fixed jaw member.

6. In a clamp assembly comprising a support member having a grooved bore, a pair of jaws, one of which is fixedly related and the other movably related to said support member, a wedge having a grooved bore, and a screw having two sets of oppositely handed threads, one set of said threads being adapted to engage the grooves within the bore of said support member, and the other set of said threads being adapted to engage the grooves of the bore of said wedge, rotation of said screw serving both to advance the screw into said support member and simultaneously to draw said wedge onto said screw toward said support member into contact with said movable jaw member to control the position of said movable jaw member.

7. In a clamp assembly comprising a support member having a grooved bore, a pair of jaws, one of which is fixedly related and the other movably related to said support member, a wedge having a grooved bore, and a screw oppositely threaded on opposite ends, the threads on the head end of said screw being adapted to engage the grooves within the bore in said support member, and the threads on the forward end of said screw being adapted to engage the grooves of the bore of said wedge, and the threads on the forward end of said screw being greater in number than the threads on the head end of said screw.

8. A clamp, for holding paper on the surface of an abrasive drum having laterally extending annular flanges, comprising, a jaw adapted to fit over a portion of the exterior surface of the drum, support means for the jaw extending radially of the drum, a first wedge member having an outer surface adapted to fit against the inner surface of said annular flange, said wedge member having an inner inclined surface, a second wedge member having an outer face inclined oppositely to the inner face of said first member, means for mounting said first and second members with their inclined faces in contact, and means for moving said members relatively to cause said first member to grip the inner surface of said annular flange.

HENRY D. GURSKY.

REFERENCES CITED

The following references are of record in the file of this patent:

UNITED STATES PATENTS

| Number | Name | Date |
| --- | --- | --- |
| 2,010,557 | Nenninger et al. | Aug. 6, 1935 |

FOREIGN PATENTS

| Number | Country | Date |
| --- | --- | --- |
| 493,985 | Great Britain | Oct. 18, 1938 |